US010815388B2

(12) United States Patent
Konarski et al.

(10) Patent No.: US 10,815,388 B2
(45) Date of Patent: Oct. 27, 2020

(54) PRIMER COMPOSITIONS FOR INJECTION MOLDING

(71) Applicant: Henkel IP & Holding GmbH, Duesseldorf (DE)

(72) Inventors: Mark M. Konarski, Old Saybrook, CT (US); Nicholas Penrose, Old Saybrook, CT (US); Darren Nolan, Dublin (IE); Brian Deegan, Dublin (IE)

(73) Assignee: Henkel IP & Holding GmbH, Duesseldorf (DE)

(*) Notice: Subject to any disclaimer, the term of this patent is extended or adjusted under 35 U.S.C. 154(b) by 0 days.

(21) Appl. No.: 14/951,661

(22) Filed: Nov. 25, 2015

(65) Prior Publication Data

US 2016/0075902 A1 Mar. 17, 2016

Related U.S. Application Data

(63) Continuation of application No. PCT/US2014/039693, filed on May 28, 2014.
(Continued)

(51) Int. Cl.
*C09D 109/06* (2006.01)
*C09D 4/06* (2006.01)
(Continued)

(52) U.S. Cl.
CPC ...... *C09D 109/06* (2013.01); *B29C 45/14311* (2013.01); *C09D 4/06* (2013.01); *B29C 45/0001* (2013.01); *B29C 45/14* (2013.01); *B29C 45/16* (2013.01); *B29C 45/1657* (2013.01); *B29C 45/1671* (2013.01); *B29C 2045/14868* (2013.01); *B29K 2033/00* (2013.01); *B29K 2033/08* (2013.01); *B29K 2033/18* (2013.01); *B29K 2033/20* (2013.01); *B29K 2033/26* (2013.01); *B29K 2069/00* (2013.01); *B29K 2105/0002* (2013.01); *B29K 2105/20* (2013.01); *B29K 2705/02* (2013.01); *B29K 2709/08* (2013.01); *B32B 7/04* (2013.01); *B32B 7/12* (2013.01); *B32B 27/06* (2013.01); *B32B 27/08* (2013.01); *B32B 27/30* (2013.01);
(Continued)

(58) Field of Classification Search
None
See application file for complete search history.

(56) References Cited

U.S. PATENT DOCUMENTS

| 4,258,123 A | 3/1981 | Nagashima et al. |
| 4,383,903 A * | 5/1983 | Ayano ................ C08F 2/20 430/196 |

(Continued)

FOREIGN PATENT DOCUMENTS

| CN | 1517773 A | 8/2004 |
| CN | 1813003 A | 8/2006 |

(Continued)

OTHER PUBLICATIONS

International Search Report for International Patent Application No. PCT/US2014/039693 dated Dec. 18, 2014.

*Primary Examiner* — Vivian Chen
(74) *Attorney, Agent, or Firm* — James E. Piotrowski

(57) ABSTRACT

Curable compositions, such as by way of exposure to radiation in the electromagnetic spectrum, for use as a primer composition for injection molding applications, are provided.

15 Claims, 1 Drawing Sheet

Related U.S. Application Data

(60) Provisional application No. 61/828,827, filed on May 30, 2013.

(51) Int. Cl.

| | | |
|---|---|---|
| *B29C 45/14* | (2006.01) | |
| *C08F 220/56* | (2006.01) | |
| *C08F 220/30* | (2006.01) | |
| *C08F 236/12* | (2006.01) | |
| *C08F 220/20* | (2006.01) | |
| *C08F 220/18* | (2006.01) | |
| *C08F 224/00* | (2006.01) | |
| *C09D 159/00* | (2006.01) | |
| *C09D 179/04* | (2006.01) | |
| *C09J 4/06* | (2006.01) | |
| *C09J 109/06* | (2006.01) | |
| *C09J 159/00* | (2006.01) | |
| *C09D 5/00* | (2006.01) | |
| *C09D 179/00* | (2006.01) | |
| *C09J 179/00* | (2006.01) | |
| *C09J 179/04* | (2006.01) | |
| *B29K 33/00* | (2006.01) | |
| *B29K 105/00* | (2006.01) | |
| *B29K 705/02* | (2006.01) | |
| *B29K 709/08* | (2006.01) | |
| *B32B 27/06* | (2006.01) | |
| *B32B 27/36* | (2006.01) | |
| *B32B 37/04* | (2006.01) | |
| *B32B 27/08* | (2006.01) | |
| *B32B 7/04* | (2019.01) | |
| *B32B 37/12* | (2006.01) | |
| *B32B 37/14* | (2006.01) | |
| *B32B 7/12* | (2006.01) | |
| *B32B 27/30* | (2006.01) | |
| *C08K 5/17* | (2006.01) | |
| *B29C 45/16* | (2006.01) | |
| *B29C 45/00* | (2006.01) | |
| *B29K 69/00* | (2006.01) | |
| *B29K 33/18* | (2006.01) | |
| *B29K 105/20* | (2006.01) | |
| *B29K 33/20* | (2006.01) | |

(52) U.S. Cl.
CPC ............ *B32B 27/302* (2013.01); *B32B 27/36* (2013.01); *B32B 27/365* (2013.01); *B32B 37/04* (2013.01); *B32B 37/12* (2013.01); *B32B 37/142* (2013.01); *B32B 2037/1253* (2013.01); *B32B 2250/02* (2013.01); *B32B 2255/26* (2013.01); *B32B 2355/00* (2013.01); *B32B 2355/02* (2013.01); *B32B 2369/00* (2013.01); *C08F 220/18* (2013.01); *C08F 220/20* (2013.01); *C08F 220/30* (2013.01); *C08F 220/56* (2013.01); *C08F 224/00* (2013.01); *C08F 236/12* (2013.01); *C08K 5/17* (2013.01); *C09D 5/002* (2013.01); *C09D 159/00* (2013.01); *C09D 179/00* (2013.01); *C09D 179/04* (2013.01); *C09J 4/06* (2013.01); *C09J 109/06* (2013.01); *C09J 159/00* (2013.01); *C09J 179/00* (2013.01); *C09J 179/04* (2013.01)

(56) References Cited

U.S. PATENT DOCUMENTS

| | | | |
|---|---|---|---|
| 4,505,793 A | | 3/1985 | Tamoto et al. |
| 4,902,578 A | * | 2/1990 | Kerr, III ................ C08J 7/047 427/508 |
| 4,957,677 A | * | 9/1990 | Katoh ............... B29C 45/14311 264/135 |
| 5,143,785 A | * | 9/1992 | Pujol ................. C08G 73/0655 252/512 |
| 5,205,895 A | * | 4/1993 | Hohman, Jr. ....... B29C 65/5057 156/293 |
| 5,215,860 A | * | 6/1993 | McCormick ....... C08G 73/0661 204/157.72 |
| 5,395,862 A | | 3/1995 | Neckers et al. |
| 5,399,770 A | | 3/1995 | Leppard et al. |
| 5,451,343 A | | 9/1995 | Neckers et al. |
| 5,545,676 A | | 8/1996 | Palazzotto et al. |
| 5,605,999 A | | 2/1997 | Chu et al. |
| 5,744,557 A | * | 4/1998 | McCormick ............ B32B 27/06 526/131 |
| 5,856,022 A | * | 1/1999 | McCormick .......... C08F 265/06 428/500 |
| 2003/0008934 A1 | * | 1/2003 | Zychowski ............. C09D 4/00 522/7 |
| 2003/0118833 A1 | * | 6/2003 | Valeri ................... C08F 283/10 428/412 |
| 2003/0141672 A1 | * | 7/2003 | Andou ................... F16J 15/122 277/628 |
| 2003/0224172 A1 | * | 12/2003 | McBain ................ C08F 283/10 428/411.1 |
| 2004/0219306 A1 | | 11/2004 | Wang et al. |
| 2005/0234145 A1 | * | 10/2005 | Sitzmann .............. C07F 9/5337 522/6 |
| 2007/0096355 A1 | | 5/2007 | Yashiro et al. |
| 2008/0188609 A1 | * | 8/2008 | Agarwal ................ C08L 51/04 524/504 |
| 2008/0311287 A1 | * | 12/2008 | Chen ................ B29D 11/00865 427/164 |
| 2009/0104448 A1 | * | 4/2009 | Thompson .............. B32B 37/12 428/413 |
| 2009/0298970 A1 | * | 12/2009 | Attarwala ............. C08F 265/06 523/201 |
| 2009/0326091 A1 | * | 12/2009 | Loccufier .................. C08F 2/50 522/26 |
| 2010/0003523 A1 | * | 1/2010 | Sharygin ........... B29C 45/14688 428/412 |
| 2011/0018127 A1 | * | 1/2011 | Lee ............................ C09J 7/00 257/729 |
| 2011/0049747 A1 | * | 3/2011 | Tsai .................... B29C 45/14311 264/135 |
| 2011/0269894 A1 | * | 11/2011 | Miyamoto ................ C08F 2/24 524/532 |
| 2012/0070631 A1 | * | 3/2012 | Chuang .................... B32B 38/06 428/195.1 |
| 2013/0071631 A1 | * | 3/2013 | Chao ........................ B32B 7/12 428/195.1 |
| 2013/0071635 A1 | * | 3/2013 | Chao ................... B29C 45/14811 428/201 |
| 2014/0036353 A1 | * | 2/2014 | Krogdahl ............. B29C 66/73361 359/350 |
| 2015/0014170 A1 | * | 1/2015 | Naisby .............. B01L 3/502707 204/600 |
| 2015/0353675 A1 | * | 12/2015 | Duquenne ............... C08F 4/461 524/611 |
| 2016/0298008 A1 | * | 10/2016 | Tasaka ..................... B32B 27/06 |
| 2018/0215929 A1 | * | 8/2018 | Deegan ............... B29C 45/14311 |

FOREIGN PATENT DOCUMENTS

| | | | |
|---|---|---|---|
| EP | 0369645 A1 | | 5/1990 |
| EP | 0563925 A1 | | 10/1993 |
| EP | 0323560 B1 | | 10/1994 |
| GB | 2 295 420 A | * | 5/1996 |
| GB | 2012-04011 | * | 4/2012 |
| GB | 2500029 A | * | 9/2013 |
| JP | S536336 A | | 1/1978 |
| JP | H10212431 A | | 8/1998 |
| WO | 2005100408 A1 | | 10/2005 |

* cited by examiner

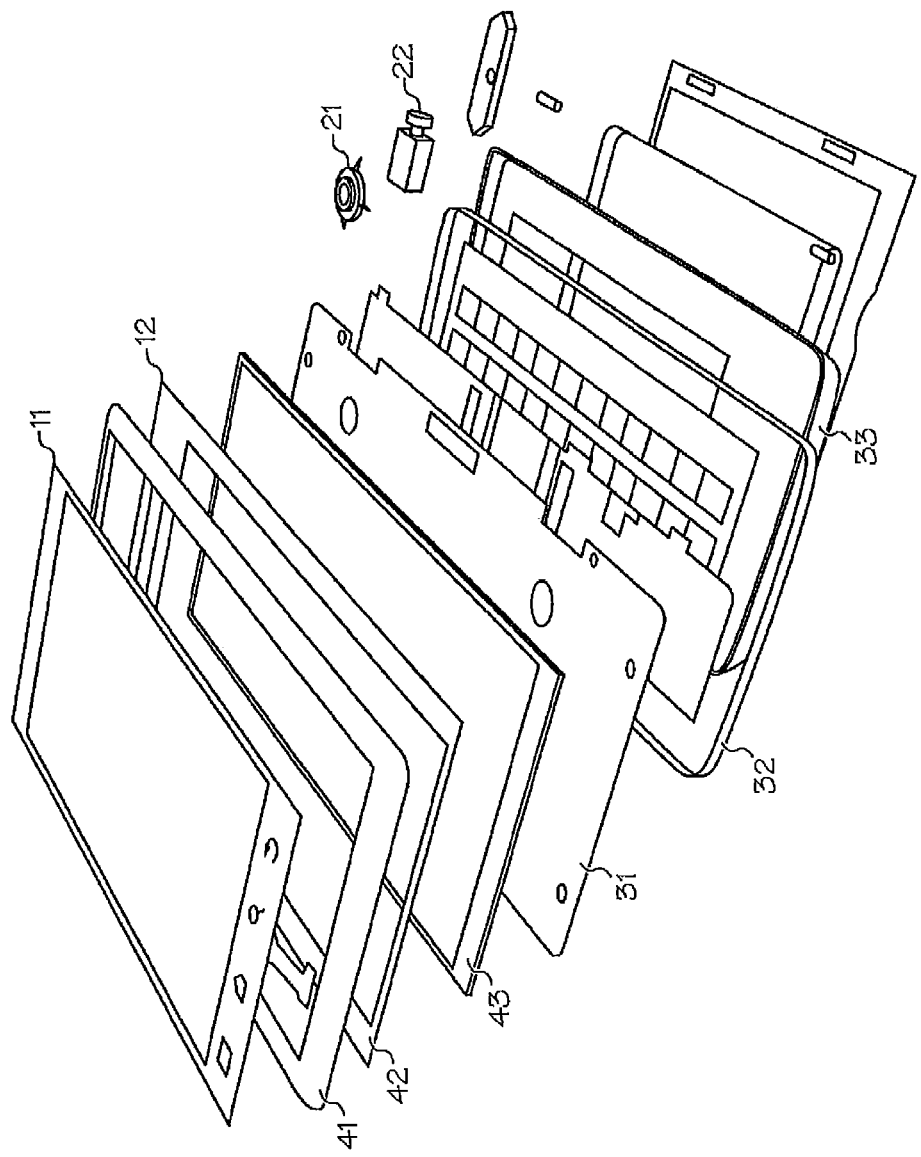

PRIMER COMPOSITIONS FOR INJECTION MOLDING

This application is a continuation of PCT/US2014/039693, filed May 28, 2014, which claims benefit of U.S. Provisional Application No. 61/828,827, filed on May 30, 2013.

BACKGROUND

Field

Curable compositions, such as by way of exposure to radiation in the electromagnetic spectrum, for use as a primer composition for injection molding applications, are provided.

Brief Description of Related Technology

Presently, there is a drive to streamline the manufacturing process in numerous markets, but especially for hand held consumer electronics. To this end, it would be desirable to eliminate the often slow and sometimes costly process of joining plastic parts to metal frames and glass displays with traditional adhesives, in what is called an overmolding process.

Others have attempted to provide tie-layer coatings for such overmolding assembly processes through the use of waterborne, solvent-applied and/or two component adhesives. Each of these approaches have been met with criticism.

For instance, waterborne and solvent-applied adhesives often compromise many application techniques because of their propensity to form films when exposed to air for all but brief time periods. In addition, lengthy drying processes (which may be complex and/or costly) need to be used in order remove the aqueous or solvent carriers. Two component adhesives require mixing prior to use and ordinarily undergo a lengthy cure process, which also often involves a costly heating step.

Another drawback to the use of these types of adhesive technologies is that the on-part worklife before overmolding is short and therefore does not lend itself to a separate offline process from the main overmolding assembly process. In other words, it becomes impractical to perform a B stage process with these traditional adhesives on the part to be overmolded prior to use in the overmolding assembly process.

Accordingly, the need exists and would be met with commercial excitement for a primer composition for use in an overmolding assembly process that is carrier free, does not require long and/or costly processing times, and which has improved on-part worklife.

SUMMARY

That need has now been met.

Provided herein in one aspect is a photocurable primer composition, comprising:
    a (meth)acrylate monomer component;
    a photoinitiator component; and
    a rubber component comprising the combination of a core shell rubber having a mean diameter in the range of about 100 to about 300 nm and a polyvinyl butyral component having a molecular weight of less than about 120,000 Mw.

In another aspect is provided a composition comprising:
    a (meth)acrylate monomer component;
    a photoinitiator component;
    a rubber component comprising the combination of a core shell rubber having a mean diameter in the range of 100 to about 300 nm and a polyvinyl butyral component having a molecular weight of less than about 120,000 Mw; and
    a cyanate ester component.

In yet another aspect is provided a composition comprising:
    a (meth)acrylate monomer component;
    a photoinitiator component;
    a rubber component comprising the combination of a core shell rubber having a mean diameter in the range of 100 to about 300 nm and a polyvinyl butyral component having a molecular weight of less than about 120,000 Mw; and
    an aromatic amine component, such as an aminated diphenyl sulfone component.

In still yet another aspect is provided a composition comprising:
    a (meth)acrylate monomer component;
    a photoinitiator component;
    a rubber component comprising the combination of a core shell rubber having a mean diameter in the range of 100 to about 300 nm and a polyvinyl butyral component having a molecular weight of less than about 120,000 Mw;
    a cyanate ester component; and
    an amine component, such as an aromatic amine component, like an aminated diphenyl sulfone component, or a cycloaliphatic diamine component, like diaminodicyclohexylmethane.

In a further aspect is provided a combination comprising:
    the composition of any of the foregoing aspects; and
    a thermoplastic resin.

In a still further aspect is provided a combination comprising:
    an article having coated as a layer on at least a surface thereof a B-staged version of the composition of any of the foregoing aspects; and
    a thermoplastic resin in contact with the B-staged version of the composition.

In an additional aspect is provided a process for forming an injection molding about an article, comprising the steps of
    disposing into an injection molding cavity an article about which a thermoplastic material is to be molded into a shape; and
    injecting into the injection molding cavity in which is disposed the article the thermoplastic material at a temperature and pressure to permit the material to flow around and about the article in the mold and maintaining the mold under a temperature and pressure appropriate to permit the thermoplastic material to solidify,
    where prior to disposition of the article, the article is primed with the composition of any of the foregoing aspects and exposed to radiation in the electromagnetic spectrum appropriate to cure the composition.

BRIEF DESCRIPTION OF THE FIGURE

FIG. 1 depicts an exploded view of various component layers of a hand held consumer electronic display device, about which overmolding may be used as the interface therebetween.

DETAILED DESCRIPTION

As noted above, provided herein generally are several aspects of the invention. More specifically, they are:

In one aspect is a photocurable primer composition, comprising:
    (a) a (meth)acrylate monomer component;

(b) a photoinitiator component; and (c) a rubber component comprising the combination of a core shell rubber having a mean diameter in the range of about 100 to about 300 nm and a polyvinyl butyral component having a molecular weight of less than about 120,000 Mw.

In another aspect is provided a composition comprising:
(a) a (meth)acrylate monomer component;
(b) a photoinitiator component;
(c) a rubber component comprising the combination of a core shell rubber having a mean diameter in the range of 100 to about 300 nm and a polyvinyl butyral component having a molecular weight of less than about 120,000 Mw; and
(d) a cyanate ester component.

In yet another aspect is provided a composition comprising:
(a) a (meth)acrylate monomer component;
(b) a photoinitiator component;
(c) a rubber component comprising the combination of a core shell rubber having a mean diameter in the range of 100 to about 300 nm and a polyvinyl butyral component having a molecular weight of less than about 120,000 Mw; and
(d) an amine component, such as an aromatic amine component, like an aminated diphenyl sulfone component, or a cycloaliphatic diamine component, like diaminodicyclohexylmethane.

In still yet another aspect is provided a composition comprising:
(a) a (meth)acrylate monomer component;
(b) a photoinitiator component;
(c) a rubber component comprising the combination of a core shell rubber having a mean diameter in the range of 100 to about 300 nm and a polyvinyl butyral component having a molecular weight of less than about 120,000 Mw;
(d) a cyanate ester component; and
(e) an amine component, such as an aromatic amine component, like an aminated diphenyl sulfone component, or a cycloaliphatic diamine component, like diaminodicyclohexylmethane.

In a further aspect is provided a combination comprising:
the composition of any of the foregoing aspects; and
a thermoplastic resin.

In a still further aspect is provided a combination comprising:
(a) an article having coated as a layer on at least a surface thereof a B-staged version of the composition of any of the foregoing aspects; and
(b) a thermoplastic resin in contact with the B-staged version of the composition.

In an additional aspect is provided a process for forming an injection molding about an article, comprising the steps of
disposing into an injection molding cavity an article about which a thermoplastic material is to be molded into a shape; and
injecting into the injection molding cavity in which is disposed the article the thermoplastic material at a temperature and pressure to permit the material to flow around and about the article in the mold and maintaining the mold under a temperature and pressure appropriate to permit the thermoplastic material to solidify,
where prior to disposition of the article, the article is primed with the composition of any of the foregoing aspects and exposed to radiation in the electromagnetic spectrum appropriate to cure the composition.

Common to all of these aspects is a (meth)acrylate component. The (meth)acrylate may be selected from one or more of a wide variety of materials, such as those represented by $H_2C=CGCO_2R^1$, where G may be hydrogen or alkyl groups having from 1 to about 4 carbon atoms, and $R^1$ may be selected from alkyl, cycloalkyl, alkenyl, cycloalkenyl, alkaryl, aralkyl or aryl groups having from 1 to about 16 carbon atoms, any of which may be optionally substituted or interrupted as the case may be with silane, silicon, oxygen, halogen, carbonyl, hydroxyl, ester, carboxylic acid, urea, urethane, carbonate, amine, amide, sulfur, sulfonate, sulfone and the like. Examples include N,N-dimethyl acrylamide, phenoxy ethyl(meth)acrylate, tetrahydrofuryral (meth)acrylate, cyclohexyl(meth)acrylate, isobornyl(meth)acrylate, butyl(meth)acrylate, hydroxyethyl(meth)acrylate, and hydroxypropyl(meth)acrylate.

Additional (meth)acrylate monomers suitable for use herein include polyfunctional (meth)acrylate monomers, such as, but not limited to, di-or tri-functional (meth)acrylates like polyethylene glycol di(meth)acrylates, tetrahydrofuran(meth)acrylates and di(meth)acrylates, hydroxypropyl(meth)acrylate ("HPMA"), hexanediol di(meth)acrylate, trimethylol propane tri(meth)acrylate ("TMPTMA"), diethylene glycol dimethacrylate, triethylene glycol dimethacrylate ("TRIEGMA"), tetraethylene glycol dimethacrylate, dipropylene glycol dimethacrylate, di-(pentamethylene glycol)dimethacrylate, tetraethylene diglycol diacrylate, diglycerol tetramethacrylate, tetramethylene dimethacrylate, ethylene dimethacrylate, neopentyl glycol diacrylate, trimethylol propane triacrylate and bisphenol-A mono and di(meth)acrylates, such as ethoxylated bisphenol-A (meth)acrylate ("EBIPMA"), and bisphenol-F mono and di(meth)acrylates, such as ethoxylated bisphenol-F (meth)acrylate.

Still other (meth)acrylate monomers that may be used herein include silicone (meth)acrylate moieties ("SiMA"), such as those taught by and claimed in U.S. Pat. No. 5,605,999 (Chu), the disclosure of which is hereby expressly incorporated herein by reference.

Of course, combinations of these (meth)acrylate monomers may also be used. Though desirably, the (meth)acrylate monomer component is selected from one or more of N,N-dimethyl acrylamide, phenoxy ethyl(meth)acrylate, tetrahydrofuryral(meth)acrylate, cyclohexyl(meth)acrylate, isobornyl(meth)acrylate, butyl(meth)acrylate, hydroxyethyl (meth)acrylate, and hydroxypropyl(meth)acrylate.

The (meth)acrylate component should comprise from about 10 to about 90 percent by weight, such as about 40 to about 80 percent by weight, based on the total weight.

The photoinitiator may be selected from one or more of initiators triggered by radiation in the ultraviolet region of the electromagnetic spectrum, the visible region of the electromagnetic spectrum, or both.

The photoinitiator may be a benzophenone or substituted benzophenone, such as, for example, an α-hydroxyketone. One particularly suitable .α-hydroxyketone is 1-hydroxycyclohexyl-phenyl-ketone (commercially available as IRGACURE 184 from Ciba Specialty Chemicals, Inc.). Other suitable α-hydroxyketones and blends thereof include: 2-hydroxy-2-methyl-1-phenyl-propan-1-one (DAROCUR 1173); 2-hydroxy-1-[4-(2-hydroxyethoxy)phenyl]-2-methyl-1-propanone (IRGACURE 2959); and blends such as IRGACURE 1000 and IRGACURE 500 (all commercially available from Ciba Specialty Chemicals, Inc.). Other suitable UV photoinitiators include: acetophenone and substituted acetophenones; benzoin and its alkyl esters; xanthone and substituted xanthones; diethoxy-acetophenone; benzoin methyl ether; benzoin ethyl ether; benzoin isopropyl ether; diethoxyxanthone; chloro-thio-xanthone; N-methyl diethanol-amine-benzophenone; 1-benzoyl cyclohexanol; 2-benzyl-2-(dimethylamino)-1-[4-(4-morpholinyl)phenyl]-1-butanone; amino ketones, such as IRGACURE 907, IRGACURE 369 and IRGACURE 1300 (all commercially available from Ciba Specialty Chemicals, Inc.); benzildimethyl-ketals, such as IRGACURE 651 (commercially available from Ciba Specialty Chemicals, Inc.); BAPO (bis acyl phosphine oxide) and blends thereof, such as IRGACURE 819, IRGACURE 1700, IRGACURE 1800, IRGACURE 1850, and DAROCUR 4265 (all commercially available from Ciba Specialty Chemicals, Inc.); metallocenes, such as IRGACURE 784 and IRGACURE 261 (both commercially available from Ciba Specialty Chemicals, Inc.); benzophenones, such as DAROCUR BP (commercially available from Ciba Specialty Chemicals, Inc.); and mixtures thereof.

U.S. Pat. No. 5,399,770 discloses and claims a class of compounds functional as such photoinitiators. Thus, the disclosure of the '770 patent is hereby express incorporated herein be reference in its entirety. A particularly desirable photoinitiator embraced by the '770 patent is available commercially from Ciba Specialty Chemicals under the trade name IRGACURE 819. IRGACURE 819 is bis(2,4,6-trimethyl benzoyl)phenyl phosphine oxide.

Camphorquinone peroxyester initiators; 9-fluorene carboxylic acid peroxyesters; dl-camphorquinone; IRGACURE 784DC (photoinitiator based on substituted titanocenes); two-component initiators including a dye and electron donor; three-component initiators including a dye, electron donor and oxidant; and combinations thereof, may also be used. These visible light photoinitiators may be used in conjunction with bisacyl phosphine oxide photoinitiators to achieve the desired effect.

As regards two component initiators, suitable dyes include, but are not limited to camphorquinone, 5,7-diiodo-3-butoxy-6-fluorone, rose bengal, riboflavin, eosin Y, benzil, fluorone dyes, benzil derivatives, ketocoumarins, acridine dyes, benzoflavin and combinations thereof, and suitable electron donors include, but are not limited to methyldiethanolamine, dimethyl-p-toluidine, N,N-dimethylaminoethyl methacrylate, ethyl 4-dimethylaminobenzoate and combinations thereof.

And as regards three component initiators, in addition to the two components noted above, as the third component suitable oxidants include, but are not limited to bis(trichloromethyl)triazines, onium salts and combinations thereof. Examples of onium salts include sulfonium and iodonium salts.

Other suitable visible photoinitiator systems include those disclosed in each of the following patents or publications, each of which is incorporated by reference herein in its entirety. U.S. Pat. No. 4,505,793, which is incorporated by reference herein, discloses photopolymerization initiators that include a combination of a 3-keto-substituted coumarin compound and an active halogeno compound. A number of exemplary compounds are disclosed. Such photopolymerization initiators cure by exposure to light having wavelengths ranging between about 180 nm and 600 nm. U.S. Pat. No. 4,258,123, which is incorporated by reference herein, discloses photosensitive resin compositions including initiator components that generate a free radical upon irradiation with actinic light. Such components include various triazine compounds, as more fully described therein.

European Patent Publication No. EP 0 369 645 A1 discloses a three-part photoinitiator system which includes a trihalomethyl substituted-s-triazine, a sensitizing compound capable of absorbing radiation in the range of about 300-1000 nm and an electron donor. Exemplary sensitizing compounds are disclosed, including: ketones; coumarin dyes; xanthene dyes; 3H-xanthen-3-one dyes; acridine dyes; thiazole dyes; thiazine dyes; oxazine dyes; azine dyes; aminoketone dyes; methane and polymethine dyes; porphyrins; aromatic polycyclic hydrocarbons; p-substituted aminostyryl ketone compounds; aminotriaryl methanes; merocyanines; squarylium dyes; and pyridinium dyes. Exemplary donors also are disclosed, including: amines; amides; ethers; ureas; ferrocene; sulfinic acids and their salts; salts of ferrocyanide; ascorbic acid and its salts; dithiocarbamic acid and its salts; salts of xanthates; salts of ethylene diamine tetraacetic acid; and salts of tetraphenylboronic acid. Such initiators are sensitive to both UV and visible light.

European Patent Publication No. EP 0 563 925 A1 discloses photopolymerization initiators including a sensitizing compound that is capable of absorbing radiation in the range of about 250-1000 nm and 2-aryl-4,6-bis(trichloromethyl)-1,3,5-triazine. Exemplary sensitizing compounds that are disclosed include dyes such as cyanine, merocyanine, coumarin, ketocoumarin, (thio)xanthene, acridine, thiazole, thiazine, oxazine, azine, aminoketone, squarylium, pyridinium, (thia)pyrylium, porphyrin, triaryl methane, (poly)methane, amino styryl compounds and aromatic polycyclic hydrocarbons. These photopolymerization initiators are sensitive to UV and visible light.

U.S. Pat. No. 5,395,862, which is expressly incorporated by reference herein, discloses fluorone photoinitiators, which are sensitive to visible light. Such fluorone initiator systems also include a coinitiator, which is capable of accepting an electron from the excited fluorone species. Exemplary coinitiators are disclosed, including: onium salts, nitrohalomethanes and diazosulfones. U.S. Pat. No. 5,451,343, which is incorporated herein by reference, discloses fluorone and pyronin-Y derivatives as initiators that absorb light at wavelengths of greater than 350 nm. U.S. Pat. No. 5,545,676, which is incorporated by reference herein, discloses a three-part photoinitiator system, which cures under UV or visible light. The three-part system includes an arylidonium salt, a sensitizing compound and an electron donor. Exemplary iodonium salts include diphenyliodonium salts.

2,4,6 trimethylbenzoyldiphosphine oxide and 1-hydroxycyclohexyl-phenyl ketone are two particularly desirable photoinitiators for use in the compositions.

The photoinitiator component should be present in an amount of about 1 to about 5 weight percent.

The rubber component comprises the combination of a core shell rubber having a mean diameter in the range of 100 to about 300 nm and a polyvinyl butyral component having a molecular weight of less than about 120,000 Mw, such as in the range of about 40,000 to about 70,000 Mw.

The rubber component should be present in an amount of about 15 to about 35 weight percent, such as about 20 to about 30 weight percent.

The core shell rubber desirably has a core constructed of styrene butadiene rubber and a shell constructed of polyacrylate. Many commercial sources of core shell rubbers exist, though chief among them for this technology is Kaneka North America LLC, Houston, Tex., which supplies such rubbers under the Kane Ace trade name, such as Kane Ace MX. Particularly desirable among the Kane Ace-branded product offerings are those dispersed in a (meth) acrylate carrier. One such example is Kane Ace MX 920, which uses phenoxyethyl acrylate as a carrier and has the core shell rubber present in a dispersion in an amount of about 15 weight percent, as reported by the manufacturer.

The core shell rubber portion of the rubber component should be between about 100 weight percent to about 200 weight percent relative to the polyvinyl butyral component. Desirably, the core shell rubber portion of the rubber component is about 150 weight percent of the polyvinyl butyral portion.

In some aspects, a cyanate ester component is also present in the composition. Representative examples of the cyanate ester component include one or more of bisphenol A dicyanate ester (and fluorinated analogues thereof), phenol novolac polycyanate ester, bisphenol E dicyanate ester, bisphenol F dicyanate ester, dicyclopentadiene diol dicyanate ester, 1,3-dicyanatobenzene, 1,4-dicyanatobenzene, 1,3,5-tricyanatobenzene, 1,3-, 1,4-, 1,6-, 1,8-, 2,6- or 2,7-dicyanatonaphthalene, 1,3,6-tricyanatonaphthalene, 4,4'-dicyanato-biphenyl, bis(4-cyanatophenyl)methane and 3,3',5,5'-tetramethyl, bis(4-cyanatophenyl)methane, 2,2-bis(3,5-dichloro-4-cyanatophenyl)propane, 2,2-bis(3,5-dibromo-4-dicyanatophenyl)propane, bis(4-cyanatophenyl)ether, bis(4-cyanatophenyl)sulfide, 2,2-bis(4-cyanatophenyl)propane, tris(4-cyanatophenyl)-phosphite, tris(4-cyanatophenyl) phosphate, bis(3-chloro-4-cyanatophenyl)methane, cyanated novolac, 1,3-bis[4-cyanatophenyl-1-(methylethylidene)]benzene and cyanated, bisphenol-terminated polycarbonate or other thermoplastic oligomer.

Cyanate esters suitable for use herein are available commercially from a number of sources. For example bisphenol-E cyanate ester resin (or, 1,1'-bis(4-cyanatophenyl)ethane) is available from Huntsman under the trade name AroCy L-10. Bisphenol-A cyanate ester resin, hexafluorobisphenol-A cyanate ester resin and tetramethylbisphenol-F cyanate ester resin (or, bis(4-cyanato-3,5-dimethylphenyl)methane) are also available from Huntsman under the trade names AroCy B-10, AroCy F-10 and AroCy M-10, respectively. Bisphenol-C cyanate ester resin, bisphenol-M cyanate ester resin, phenol novolac cyanate ester resin and dicyclopentadienyl-bisphenol cyanate ester resin (or, cyanated phenol-dicyclopentadiene adduct) are available from Huntsman under trade names AroCy RD98-228, AroCy XU-366, AroCy XU-371 and XU-71787.02L.

When used, the cyanate ester component should be present in an amount of about 1 to about 10 weight percent.

In some aspects, an amine component is also present in the composition. The amine component may be an aromatic amine component or a cycloaliphatic diamine component. Examples of the aromatic amine component are aminated diphenyl sulfones, such as 3,3' diaminodiphenylsulfone, 4,4' diaminodiphenylsulfone, 3,3' diaminodiphenyl ether, 4,4' diaminodiphenyl ether, diaminodiphenylmethane, phenylene diamine, diaminodiphenylsulfide, and diaminodiphenyloxide.

Instead of or in addition to the aromatic amine component, a cycloaliphatic diamine component may be used. An example of such a component is diaminodicyclohexyl methane.

When used, the amine component should present in an amount of about 0.25 to about 5 weight percent.

In a particularly desirable aspect, the composition includes the (meth)acrylate monomer component (such as one or more of N,N-dimethylacrylamide, phenoxyethyl acrylate and tetrahydrofurfyral acrylate) present in an amount of about 20 to about 80 weight percent; the photoinitiator component (such as one or more of 2,4,6 trimethylbenzoyldiphosphine oxide and 1-hydrocyclohexyl-phenyl ketone) present in an amount of about 1 to about 5 weight percent; and the rubber component (such as the combination of a core shell rubber having a mean diameter in the range of 100 to about 300 nm and a polyvinyl butyral component having a molecular weight of less than about 120,000 Mw) present in an amount of 15 to about 35 weight percent. When used, the cyanate ester component (such as AroCy XU 366, available commercially from Huntsman Advanced Materials) is present in an amount of about 1 to about 10 weight percent and the aminated diphenyl sulfone component (such as 3,3' diaminodiphenyl sulfone) is present in an amount of about 0.25 to about 5 weight percent.

The inventive composition may be used as a primer for an article which is to be subjected to an overmolding process in which an injection molding is to be formed about the article. The article may be constructed from a variety of substrates, though glass and aluminum are the preferred choices, with anodized aluminum being a particularly desirable choice.

The inventive composition may be applied to the article to be overmolded and then exposed to radiation in the electromagnetic spectrum in order to fix the composition on at least a portion of the surface of the article.

The composition may be applied to the article in any of several ways, such as spraying, screen printing, touch transfer and the like. After application it is cured (or B staged) to a dry-to-the-touch (or tack free) surface by exposure to energy in the electromagnetic spectrum, such as UV or UV/visible radiation.

This B staging permits the primer coated article to be stored for later use in the overmolding process.

Then in the overmolding process, the primer coated article is disposed into an injection molding cavity and the cavity closed in order to receive the thermoplastic resin to be injected therein under elevated temperature and/or pressure conditions.

The thermoplastic resin is ordinarily chosen from engineering thermoplastics such as glass filled polycarbonate and PC/ABS alloys.

The thermosetting resin is ordinarily chosen from engineering thermoplastics such as polycarbonate, glass filled polycarbonate, polyarylamides such as IXEF and PC/ABS alloys. The thermoplastic resin should be injected into the molding cavity at an elevated temperature and pressure; suitable to completely mold the finished assembly in 0.5-5 seconds. The temperature time and pressure will depend on the particular thermoplastic as well as the size, geometry and path length of the mold cavity. Typical temperatures will be in the range of about 180° C. to 300° C., such as 260° C. and pressures of 50 to 5000 psi, such as 500 psi. The flow rate must be suitable to fill the entire mold cavity before the thermoplast reaches a no-flow state.

An example of one or more articles that may be formed by the overmolding process so described may be seen with reference to FIG. 1. There, several articles that are used in the assembly of hand held consumer electronic devices are highlighted as benefiting from the so disclosed overmolding technology. More specifically, four articles may be prepared with the so-disclosed overmolding technology: 1. touch panel window 11 and cover 12; 2. speaker 21 and camera lens 22; 3. cover 31, metal trim 32 and subframe 33; and 4. touch panel 41, plastic bezel 42 and metal trim 43.

EXAMPLES

Compositions as so described may be prepared by mixing together the following constituents until dissolution is reached.

| Constituent | | Sample (wt %) | | |
| --- | --- | --- | --- | --- |
| Type | Identity | A | B | C |
| Photoinitiator | HPCK[1] | 2 | 2 | 2 |
|  | TPO[2] | 2 | 2 | 2 |
| (Meth)acrylate | DMAA[3] | 20 | 20 | 20 |
| Rubber | Polyvinyl Butyral[4] | 10 | 10 | 10 |
|  | 25% nanorubber in PEA[5] | 66 | 61 | 58.5 |
| Cyanate ester | Bisphenol A dicyanate ester resin[6] |  | 5 | 5 |
| Amine | 3,3' diaminodiphenyl sulfone |  |  | 2.5 |

[1]1-hydroxycyclohexyl phenyl ketone, IRGACURE 184
[2]2,4,6 trimethylbenzoyldiphosphine oxide
[3]N,N-dimethylacetamide
[4]BUTVAR B-98
[5]KANEKA MX920
[6]PRIMASET BADCy The compositions were applied to an anodized aluminum substrate (MIL-A-8625, Type II, having a thickness between 1.8 and 2.5 microns) by draw bar to produce what appears by spectral reflectance to be a substantially uniform layer that is about 25-50 microns in thickness. The composition coated substrate was then exposed to UV radiation at an intensity of 100 mW/cm² for about 5 seconds to produce a cured tack free surface on the article.

The primer coated article can then be overmolded to produce an integrated part with excellent strength between the molded plastic and the coated article. More specifically, the primer coated article was placed into a suitable injection molding cavity. PC/ABS plastic was heated until changing state from solid to molten, at a temperature of about 260° C., within the injection molding equipment and then injected into the mold at an injection pressure of about 50-100 psi. The plastic hardens within seconds of injection, depending on the mold-volume and geometry, to produce an integrated part, which is readily removed from the mold.

The performance in terms of pulloff strength, pin-pull from coated anodized aluminum of the three compositions is as follows: 6.1 Mpa, 7.7 Mpa and 8.4 Mpa.

What is claimed is:

1. A process for forming an injection molded article, comprising:
   providing a photocurable primer composition comprising:
   10 to 90 wt. % of one or more (meth)acrylate monomers;
   optionally, 1 to 10 wt. % of a cyanate ester component;
   1 to 5 wt. % of a photoinitiator component selected from selected from the group consisting of 2,4,6 trimethylbenzoyldiphosphine oxide, 1-hydrocyclohexyl-phenyl ketone, 2-hydroxy-2-methyl-1-phenyl-propan-1-one, 2-hydroxy-1-[4-(2-hydroxyethoxy)phenyl]-2-methyl-1-propanone, acetophenone and substituted acetophenones, benzoin and its alkyl esters, xanthone and substituted xanthones, diethoxy-acetophenone, benzoin methyl ether, benzoin ethyl ether, benzoin isopropyl ether, diethoxyxanthone, chloro-thio-xanthone, N-methyl diethanol-amine-benzophenone, 1-benzoyl cyclohexanol, 2-benzyl-2-(dimethylamino)-1-[4-(4-morpholinyl)phenyl]-1-butanone; amino ketones, benzildimethyl-ketals, bis acyl phosphine oxide and benzophenones;
   about 15 to 35 wt. % of a rubber component comprising the combination of a core shell rubber having a mean diameter in the range of about 100 to about 300 nm, a polyvinyl butyral component having a molecular weight of less than about 120,000 Mw and optionally a (meth)acrylate carrier, wherein the core shell rubber and polyvinyl butyral component are present at a weight ratio of 1 to 1 to 2 to 1; and
   optionally 0.25 to about 5 wt. % of an amine component which is an aromatic amine component or a cycloaliphatic diamine component;
   providing an article;
   coating at least a portion of a surface of the article with the photocurable primer composition;
   partially but not fully curing the coating to a tack free surface by exposure to UV radiation, visible radiation or both UV radiation and visible radiation;
   providing an injection molding equipment having an open injection molding cavity;
   transferring the coated article into the open injection molding cavity;
   closing the injection molding cavity;
   injecting a molten thermoplastic resin selected from polycarbonate, glass filled polycarbonate, polyacrylamide and polycarbonate/acrylonitrile butadiene styrene alloy into the closed molding cavity and around the coated article;
   allowing the thermoplastic resin to solidify on the coated article to form the injection molded article;
   opening the injection molding cavity; and
   removing the injection molded article.

2. The process of claim 1, wherein the one or more (meth)acrylate monomers of the photocurable primer composition are selected from one or more of N, N-dimethyl acrylamide, phenoxy ethyl(meth)acrylate, tetrahydrofuryral (meth)acrylate, cyclohexyl (meth)acrylate, isobornyl (meth)acrylate, butyl (meth)acrylate, hydroxyethyl (meth)acrylate, and hydroxypropyl (meth)acrylate.

3. The process of claim 1, wherein the one or more (meth)acrylate monomers of the photocurable primer composition are present in an amount of about 40 to about 80 weight percent.

4. The process of claim 1, wherein the core shell rubber of the photocurable primer composition has a core constructed of styrene butadiene rubber and a shell constructed of polyacrylate.

5. The process of claim 1, wherein the rubber component of the photocurable primer composition is present in an amount of about 20 to about 30 weight percent.

6. The process of claim 1, wherein the cyanate ester component of the photocurable primer composition is selected from one or more of bisphenol E dicyanate ester, bisphenol F dicyanate ester, dicyclopentanediol dicyanate ester, 1,1'-bis(4-cyanatophenyl)ethane), bisphenol-A cyanate ester resin, hexafluorobisphenol-A cyanate ester resin, tetramethylbisphenol-F cyanate ester resin, bisphenol-C cyanate ester resin, bisphenol-M cyanate ester resin, phenol novolac cyanate ester resin and dicyclopentadienyl-bisphenol cyanate ester resin.

7. The process of claim 1, wherein the amine component of the photocurable primer composition is present as an aromatic amine component or a cycloaliphatic diamine component.

8. The process of claim 1, wherein the amine component of the photocurable primer composition is present in an amount of about 1 to about 5 weight percent.

9. The process of claim 1, wherein in the photocurable primer composition the one or more (meth)acrylate monomers are is present in an amount of about 20 to about 80 weight percent;

the cyanate ester component is present in an amount of about 1 to about 10 weight percent; and the amine component is an aminated diphenyl sulfone component that is present in an amount of about 0.25 to about 5 weight percent.

10. The process of claim 1, wherein the amine photocurable primer component is present in the composition as aminated diphenyl sulfone.

11. An injection molded article formed from the process of claim 1.

12. The process of claim 1 further comprising the step of storing the article and partially cured coating separately from the injection molding process prior to the step of transferring the coated article into the open injection molding cavity.

13. The process of claim 1 wherein the photocurable primer composition consists of:
   the one or more (meth)acrylate monomers;
   the cyanate ester component;
   the photoinitiator component;
   the rubber component; and
   the aromatic amine component or the cycloaliphatic diamine component.

14. The process of claim 1 wherein in the photocurable primer composition the aromatic amine component is 3,3' diaminodiphenyl sulfone and the cycloaliphatic diamine component is diaminodicyclohexylmethane.

15. The process of claim 1, wherein the one or more (meth)acrylate monomers of the photocurable primer composition comprise N, N-dimethyl acrylamide.

* * * * *

UNITED STATES PATENT AND TRADEMARK OFFICE
CERTIFICATE OF CORRECTION

PATENT NO. : 10,815,388 B2
APPLICATION NO. : 14/951661
DATED : October 27, 2020
INVENTOR(S) : Mark M. Konarski et al.

Page 1 of 1

It is certified that error appears in the above-identified patent and that said Letters Patent is hereby corrected as shown below:

In the Specification

Column 6, Line 60 change "Kaneka North America LLC, Houston, Tex." to --Kaneka North America LLC, Houston, TX.--.

Signed and Sealed this
Twentieth Day of July, 2021

Drew Hirshfeld
*Performing the Functions and Duties of the*
*Under Secretary of Commerce for Intellectual Property and*
*Director of the United States Patent and Trademark Office*